June 4, 1929.  A. W. NORDGREN  1,716,345
BUMPER FITTING
Filed Aug. 6, 1928
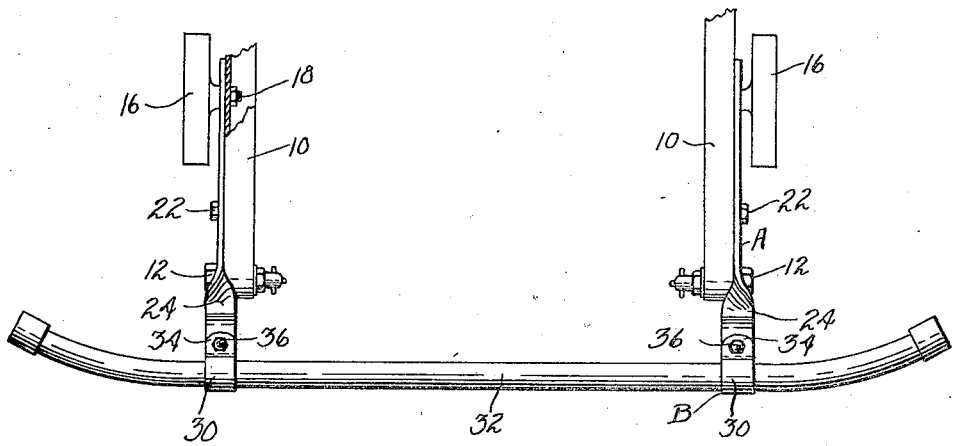
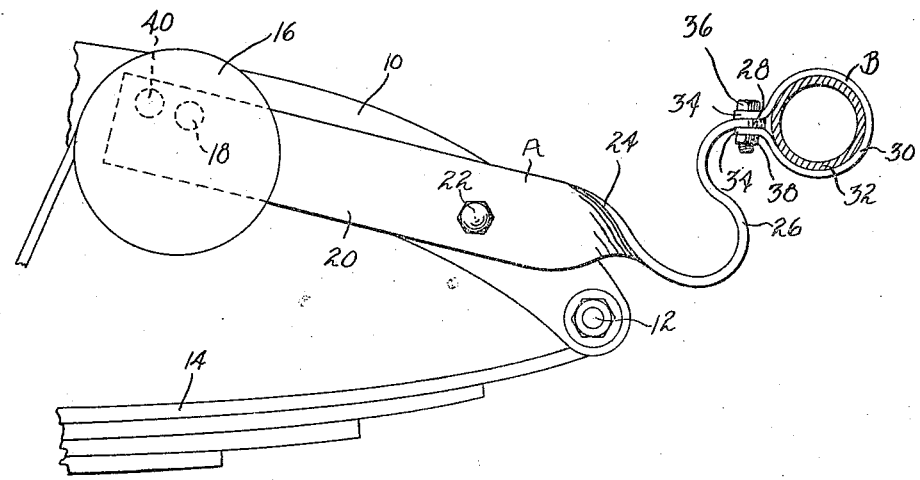

Patented June 4, 1929.

1,716,345

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER FITTING.

Application filed August 6, 1928. Serial No. 297,743.

This invention relates to a bumper fitting especially adapted for mounting bumpers on the Whippet automobile.

More particularly, this invention includes a pair of supporting arms, each having one end portion arranged for attachment to a vehicle frame member by utilizing the bolt which attaches a snubber drum thereto and also having an independent attaching means spaced from the first mentioned means, each of said arms terminating in a substantially vertically arranged S-curve, which is arranged to carry a clamping means engaging a bumper element.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view showing one end portion of an automobile chassis with a pair of my improved bumper fittings attached thereto and carrying a bumper element across the end of the frame.

Figure 2 is a side elevation partly in section and on an enlarged scale, illustrating particularly one of the bumper fittings and the means for attaching it to a vehicle frame member.

In the accompanying drawing, I have employed the numeral 10 to designate each one of a pair of longitudinal frame members of an automobile, each of said frame members having at its end, a shackle bolt 12 for supporting one end of a vehicle spring 14.

The particular make of automobile referred to includes a snubber device having a drum 16 mounted on each of the frame members 10 at a point spaced somewhat from the shackle bolt 12 and secured to the frame member by means of a bolt or the like 18, which in this instance is located somewhat above the axis of the drum.

My improved bumper fitting includes two main elements, namely a supporting member A and a clamp member B, which are employed in pairs, one in connection with each of the spaced frame members 10.

Each supporting member includes a relatively long straight bar 20, which is adapted to be mounted alongside one of the frame members 10 and to be secured thereto by a bolt 22 located adjacent the end of the frame member. The end portion of the bar 20 extends between the frame member 10 and the snubber drum 16 and is apertured to receive the supporting bolt 18 of the snubber drum.

In this, as in many other makes of automobiles, the frame members 10 are turned downwardly near their ends and the bars 20 of the supporting members A project beyond such downturned end portions of the frame and are twisted a quarter turn at the points 24 to bring the strap material of which they are formed into substantially horizontal planes.

Each of the supporting members continues outwardly and upwardly beyond its twisted portion in the form of an S-curve 26, which is arranged in substantially vertical position and terminates in a straight and substantially horizontal end portion 28. Each of the clamp members B comprises a resilient split ring or band 30, which is adapted to encompass and embrace a tubular bumper element, such as 32, extending transversely beyond the end of the vehicle frame.

Each resilient ring 30 has at one side, spaced parallel ears 34, which are apertured to receive a clamping bolt 36 having a nut 38 thereon.

Each of the straight terminal portions 28 is received between the spaced ears 34 of one of the clamp members B and is apertured to receive the clamping bolt 36.

The resilient character of the clamping rings 30 permits them to be drawn tightly and clamped upon a tubular bumper element such as 32, even though the diameter of the bumper element may vary in particular instances. This method of connection also permits of easy adjustment of the fittings longitudinally of the bumper element to bring them to the required positions for contacting with the vehicle frame members 10.

The long straight bar 20 of each supporting member A permits a rigid attachment to a vehicle frame member 10 and such attachment is simplified by utilizing the snubber bolt 18, which is already a part of the vehicle structure.

The substantially vertical S-curve of the fitting possesses some inherent resiliency for absorbing and cushioning shocks which may be received by the bumper element 32 and also serves to transmit shocks through the rigidly attached bar 20 to the frame member 10 and thence to the vehicle spring 14, whereby an efficient bumper structure is provided.

Each supporting arm 20 preferably has near its free end, a second aperture 40 (dotted lines Figure 2), which may be utilized when it is desired to mount a bumper on a Whippet Six automobile, the snubber of which is positioned a little rearwardly of that of the Whippet Four.

It is apparent that this bumper fitting is simple and inexpensive to manufacture and is easily adjusted and quickly installed.

I claim as my invention:

1. In a bumper fitting, a bar adapted to contact with a longitudinal frame member, means for attaching said bar to said frame member, said bar extending beyond the frame member and outwardly and upwardly in a substantially vertical S-curve, and a resilient clamping ring having apertured ears between which the terminal portion of the S-curve is received, together with a clamping bolt extended through said apertured ears and terminal portion.

2. In a bumper fitting, a bar adapted to contact with a longitudinal frame member, means for attaching said bar to said frame member at points spaced longitudinally of the latter, said bar extending beyond the frame member and downwardly and upwardly in a substantially vertical S-curve, and a resilient clamping ring having apertured ears between which the terminal portion of the S-curve is received, together with a clamping bolt extended through said apertured ears and terminal portion.

3. In a bumper fitting, a bar adapted to contact with a longitudinal frame member, means for attaching said bar to said frame member, said bar inclining downwardly toward the end of said frame member and projecting therebeyond, said bar being formed with an outwardly and upwardly extending S-curve beyond said bar, whereby the terminal portion thereof is in substantially the same horizontal plane as the attaching means at its opposite end, and a bumper clamp carried by the free terminal portion of the S-curve.

4. In a bumper fitting, a bar having its greater transverse dimension arranged in a vertical plane and contacting with a vehicle frame member, said bar projecting between said member and a snubber element carried thereby and being apertured to receive the attaching means for said snubber element, independent means for attaching said bar to the frame member at a point spaced from the snubber element, said bar being twisted a quarter turn beyond the frame member and extended outwardly and upwardly as an S-curve, and a bumper clamp carried by the free terminal of said S-curve.

Des Moines, Iowa, July 19, 1928.

ALGOT W. NORDGREN.